(12) United States Patent
Chan et al.

(10) Patent No.: US 6,285,091 B1
(45) Date of Patent: Sep. 4, 2001

(54) VOLTAGE SOURCE SWITCHING CIRCUIT AT REDUCED VOLTAGE DROP LEVELS

(75) Inventors: Anthony David Chan, Saratoga; Anthony Gerard Russell, San Jose, both of CA (US)

(73) Assignee: California Micro Devices Corporation, Milpitas, CA (US)

(*) Notice: Subject to any disclaimer, the term of this patent is extended or adjusted under 35 U.S.C. 154(b) by 0 days.

(21) Appl. No.: 09/309,209

(22) Filed: May 10, 1999

(51) Int. Cl.[7] ............................................. H02J 9/06
(52) U.S. Cl. .................................. 307/64; 307/66
(58) Field of Search ........................ 307/64–66, 85–87

(56) References Cited

U.S. PATENT DOCUMENTS

| | | | |
|---|---|---|---|
| 4,788,450 | * | 11/1988 | Wagner ................................. 307/66 |
| 4,908,790 | * | 3/1990 | Little et al. ........................... 307/66 |
| 5,103,157 | * | 4/1992 | Wright ................................... 307/66 |
| 5,223,748 | * | 6/1993 | Mumper et al. ...................... 307/66 |
| 5,243,269 | * | 9/1993 | Katayama et al. .................... 307/66 |
| 5,306,961 | * | 4/1994 | Leo ....................................... 307/66 |
| 5,341,034 | * | 8/1994 | Matthews ............................. 307/66 |
| 5,598,041 | * | 1/1997 | Willis .................................... 307/66 |
| 5,608,273 | * | 3/1997 | Bartlett ................................. 307/66 |
| 5,703,415 | * | 12/1997 | Tanaka ................................. 307/66 |
| 5,747,890 | * | 5/1998 | Yin ....................................... 307/87 |

* cited by examiner

*Primary Examiner*—Fritz Fleming
(74) *Attorney, Agent, or Firm*—Beyer Weaver & Thomas, LLP

(57) ABSTRACT

A voltage source switching circuit having switches capable of switching between different voltage sources with reduced voltage drop levels is disclosed. A selected one of the different voltage levels is output to a peripheral circuit or supplied to internal circuitry. In one embodiment, the switches are FET devices.

20 Claims, 7 Drawing Sheets

VOLTAGE SOURCE SWITCHING CIRCUIT AT REDUCED VOLTAGE DROP LEVELS

BACKGROUND OF THE INVENTION

1. Field of the Invention

The present invention relates to voltage source switching for electronic devices and, more particularly, to an improved voltage source switching circuit for use in electronic devices.

2. Description of the Related Art

Electronic devices, such as portable computing devices, have long been powered by alternative power sources. Typically, an electronic device can receive power from a main power source and an auxiliary power source. By way of example, in the case of a portable computing device, the main power source is AC power supplied by an AC outlet, and the auxiliary power source is DC power supplied by a battery. The auxiliary power source, e.g., the battery, is often employed as an alternative an/or backup power supply when the main power source is unavailable. The auxiliary power source, e.g., the battery, may also be used when the electronic device is turned off to maintain certain circuits such as memory cells that require small amount of power to maintain their data.

Conventionally, switching circuits have been used to facilitate switching between different power sources. FIG. 1 depicts a conventional line switching circuit 102 for use in a portable computing device. The conventional line switching circuit 102 facilitates switching between a main power source 104 and a battery 108. The main power source 104 is a primary power source and the battery 108 is an auxiliary power source. The main power source 104 can be connected to an AC power line 106, typically via an AC power outlet. The battery 108 functions as a backup or alternative source of power. A charge circuit 114 is often provided to charge the battery 108 using power from the AC power source 104.

The conventional line switching circuit 102 operates to couple either the main power source 104 or the battery 108 to an output power line 110. The output power line 110 is often used to provide power internal to the electronic device or to a peripheral circuit board 112. When the AC power line 106 is active and the electronic device is operating, it is desirable to supply power to the output power line 110 from the main power source 104. In other situations such as unavailability of AC power from the AC Power line 106 or when the electronic device is powered off, it may be desirable to supply power to the output power line 110 from the battery 108.

In such situations, to facilitate the switching between the main power supply 104 and the battery 108, the conventional line switching circuit 102 uses two diodes 114 and 116. The diode 114 is connected between the battery 108 and the output power line 110. The diode 116 is connected between the main power source 104 and the output power line 110. The switching provided by the diodes 114 and 116 is such that the power supply coupled to the output power line is either the main power supply 104 or the battery 108 depending on whichever offers the greater voltage level. For example, when the voltage at the main power source 104 is available and has a value of about 5.2 Volts and the battery 108 has a voltage of about 5 Volts, the conventional line switching circuit 102 would couple the main power source 104 to the output power line 110 because the main power source 104 has the higher voltage value. To elaborate, in this situation, with diodes 114 and 116 having identical characteristics, diode not switch-on since it would be biased below its turn-on voltage. In another situation, when the main power source 104 is not available, the voltage level for main power source 104 is dropped to about zero (0) Volts (or for some reason drops below the voltage of the battery 108), the diode 114 would switch-on and couple the battery 108 to the output power line 110 (and the diode 116 would be switched off).

One major disadvantage with the conventional line switching circuit 102 is that there is a significant voltage drop across the diodes 114 and 116. That is, voltage level for output power line 110 is significantly lower than the voltage level at the selected power source (i.e., either main power supply 104 or battery 108) due to the voltage drops across the associated diodes 114 and 116. Typically, the voltage drop is about 0.6 Volts or higher when silicon diodes are used. By way of example, if the main power supply 104 has a voltage level about 5.0 Volts, then the voltage on the output power line 110 would be about 4.4 Volts or lower when the main power supply 104 is utilized. Similarly, when the battery 108 is utilized, the battery 108 has a voltage level about 5.0 Volts because of the voltage drop for the diode 114 the output power line 110 would be about 4.4 Volts or less. To reduce voltage drops across the diodes 114 and 116, schottky diodes can be used. Schottky diodes have a lower voltage drop (about 0.4 volts) than silicon diodes (about 0.6 volts), however, schottky diodes are more expensive components than silicon diodes. It should also be noted that germanium diodes may offer a lower voltage drop than schottky diodes (about 0.2 Volts), however, they have higher reverse current leakage which makes them undesirable for power switching applications.

The effect of the voltage drop across the diodes 114 and 116 is to reduce the voltage appearing on the output power line 110. Typically, the output power line 1 10 is used to supply power to the peripheral circuit board 112. However, the peripheral circuit board 112 is manufactured with certain tolerances and the reduced voltage supplied to the peripheral circuit board 112 as a result of the voltage drops can lead to breach of tolerances and thus unstable conditions. While use of schottky diodes are of some hell), even using schottky diodes to implement a convention line switching circuit cannot satisfactorily address the problems associated with the undesired voltage drops, which are becoming more severe as operating voltages drop (e.g., from 5 Volts to 3 Volts) primarily for power conservation reasons. For example, if the tolerance level for the peripheral circuit board 112 is 10% and the main power supply 104 is on the order of 5 Volts, the peripheral circuit board 112 can function properly as long as the voltages provided to the peripheral circuit board 112 do not fluctuate more than 10%. (i.e., accepted range would be 4.5 to 5.5 volts). In this situation, even if the tolerance level for the main power supply 104 itself is 5% (i.e., power supply 104 is guaranteed to be output voltages between 4.75 volts to 5.25 Volts), there can only be a voltage drop up to 0.25 Volts across diodes 114 and 116 in order to remain within tolerance (e.g., 4.75−4.50=0.25). Recall, even using schottky diodes, the conventional line switching circuit 102 could yield a voltage drop of about 0.4 Volts. Therefore, the voltage levels provided to the peripheral circuit board 112 could fall below accepted levels.

To address the problem of voltage drop levels associated with diodes, a switching regulator could be utilized to boost voltages output from the power supplies to compensate for the voltage drop due to the diodes. However, using a switching regulator, especially for boosting DC voltages is an inefficient, costly, and complicated solution.

In the view of the forgoing, there is a need for the voltage source switching circuit capable of outputting voltages at a reduced voltage drop level.

SUMMARY OF THE INVENTION

Broadly speaking, the invention relates to a voltage source switching circuit capable of switching between different voltage sources with reduced voltage drop levels. A selected one of the different voltage sources is supplied to a peripheral circuit or internal circuitry.

The invention can be implemented in numerous ways, including as a device, an apparatus and a method. Several embodiments of the invention are discussed below.

As a voltage source switch for outputting an output voltage corresponding to one of a first voltage source and a second voltage sources, one embodiment of the invention includes: a comparator for comparing voltages on the first and second voltage sources and producing first and second switch control signals; a first switch circuit that couples the first voltage source to the output voltage when the first switch control signal is at a first state and decouples the first voltage source from the output voltage when the first switch control signal is at a second state; and a second switch circuit that couples the second voltage source to the output voltage when the second switch control signal is at a first state and decouples the second voltage source from the output voltage when the second switch control signal is at a second state.

As a voltage source switch for outputting an output voltage corresponding to one of a first voltage source and a second voltage source, another embodiment of the invention includes: a comparator for comparing voltages on the first and second voltage sources and producing a comparator control signal; a charge pump system that receives the comparator control signal and generates first and second switch signals, at least one of the first and second switch signals having a voltage level that is increased in relation to the output voltage; a first switch circuit that couples the first voltage source to the output voltage when the first switch control signal is at a first state and decouples the first voltage source from the output voltage when the first switch control signal is at a second state; and a second switch circuit that couples the second voltage source to the output voltage when the second switch control signal is at a first state and decouples the second voltage source from the output voltage when the second switch control signal is at a second state.

The invention has numerous advantages. One advantage of the invention is that voltage drops across switching elements are substantially reduced as compared to conventional approaches. Another advantage of the invention is that tolerance levels of peripheral circuitry are not compromised by the reduced voltage drops across switching elements offered by the invention. Still another advantage of the invention is that cost effective and not overly complicated implementations are possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to a voltage source switching circuit capable of switching between different voltage sources with reduced voltage drop levels. A selected one of the different voltage sources is supplied to a peripheral circuit or internal circuitry.

Embodiments of this aspect the invention are discussed below with reference to FIGS. 2–6. However, those skilled in the art will readily appreciate that the detailed description given herein with respect to these figures is for explanatory purposes as the invention extends beyond these limited embodiments.

Figure 2:
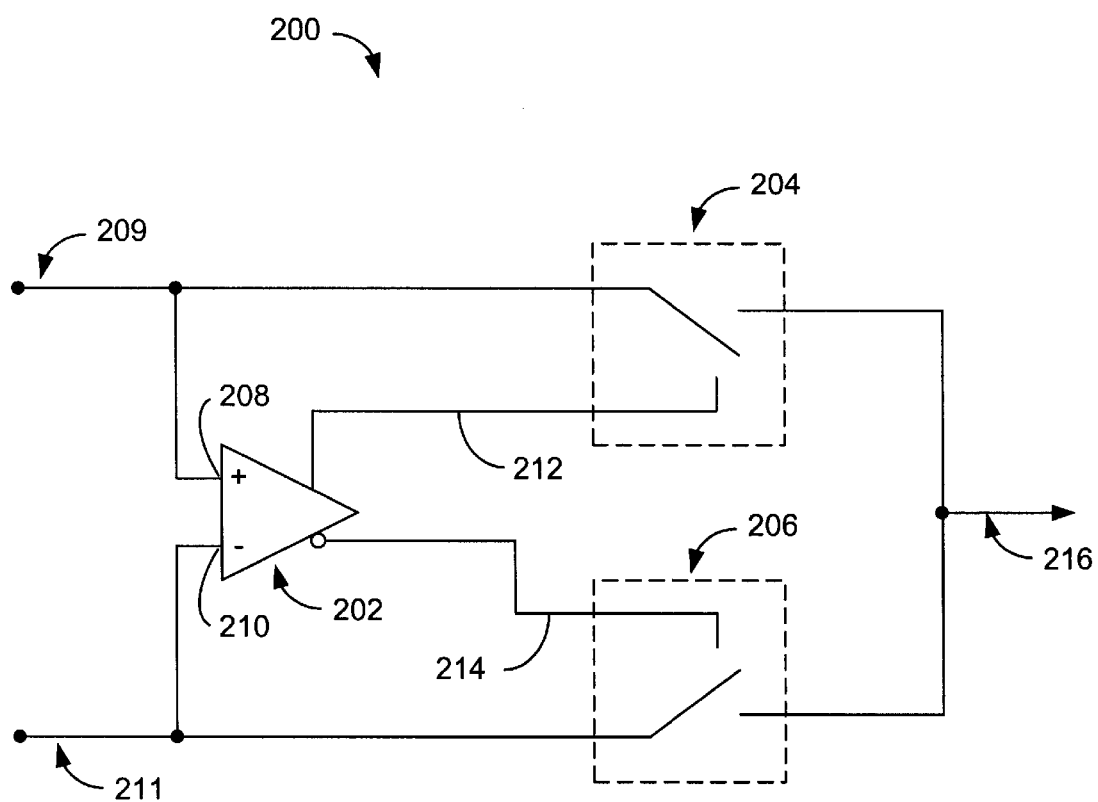
FIG. 2 is a block diagram of a voltage source switching circuit according to one embodiment of the invention.

FIG. 2 is a block diagram of a voltage source switching circuit 200 according to one embodiment of the invention. The voltage source switching circuit 200 includes a comparator 202, a first switch 204, and a second switch 206. The comparator 202 has a positive input terminal 208 that connects to a first voltage source line 209, and has a negative input terminal 210 that connects to a second voltage source line 211. The first voltage source line 209 and the second voltage source line 211 are respectively connected to first and second voltage sources (not shown). In one implementation, the first voltage source 209 can be a AC power source and the second voltage source 211 can be a battery. The comparator 202 compares the voltage levels on the first and second voltage source lines 209 and 211 and outputs first and second control signals 212 and 214.

The first and second switches 204 and 206 allow one of the first and second voltage sources to be coupled to an output power line 216 as an output voltage. The first and second control signals 212 and 214 from the comparator 202 are used to control the first and second switches 204 and 206, respectively. In other words, the comparator 202 activates (i.e., closes) one of the first and second switches 204 and 206 and deactivates (i.e., opens) the other of the first and seconds switches 204 and 206 based on the comparison of the voltage levels on the first and second voltage source lines 209 and 211. In one implementation, the second control signal 214 is an inverted version of the first control signal 212.

The comparator 202 controls the automatic switching between the first and second voltage sources based on a selection criteria such as selecting the one of the first and second voltage source lines 209 and 211 with the higher voltage value. Namely, if the voltage level at the first voltage source line 209 is higher than the voltage level at the second voltage source line 211, then the comparator 202 produces the first and second control signals such that the first switch 204 connects the first voltage source line 209 to the output power line 216 and that the second switch 206 disconnects the second voltage source line 211 from the output power line 216.

Figure 1:
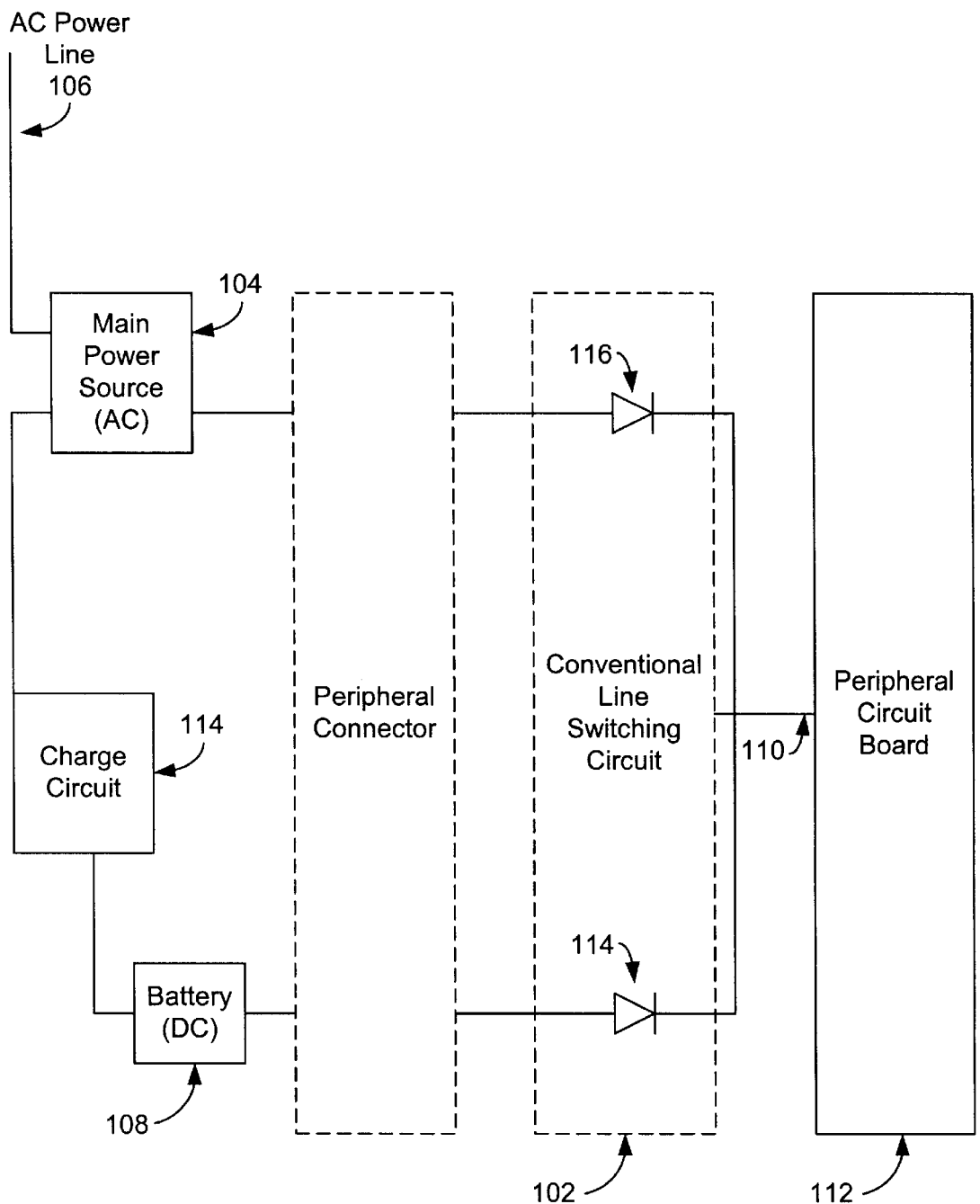
FIG. 1 depicts a conventional line switching circuit for use in a portable computing device.

The voltage drop across the first switch 204 or the second switch 206, when activated, is a lower voltage drop than normally provided with conventional designs, namely, substantially lower than the voltage drop across the diodes (silicon) in the conventional line switching circuit 102 illustrated in FIG. 1. Although diodes inherently exhibit forward voltage drops, switches can advantageously be employed to provide significantly lower voltage drops. Moreover, as it would be appreciated by those skilled in the art, voltage drops associated with switches can be minimized since switches do not inherently exhibit forward voltage drops. The reduced voltage drop levels can vary with application but for a particular embodiment of the invention, the voltage drop can be about 0.25 Volts at 0.5 Amps of current through the switch when activated. Thus, the voltage at the output power line 216 is provided without a significant drop in voltage level to the voltages at the first and second voltage sources (i.e., either the first or second voltage source 210 and 212). In one embodiment, the first and second switches 204 and 206 are implemented as Field Effect Transistors (FETs).

Figure 3:
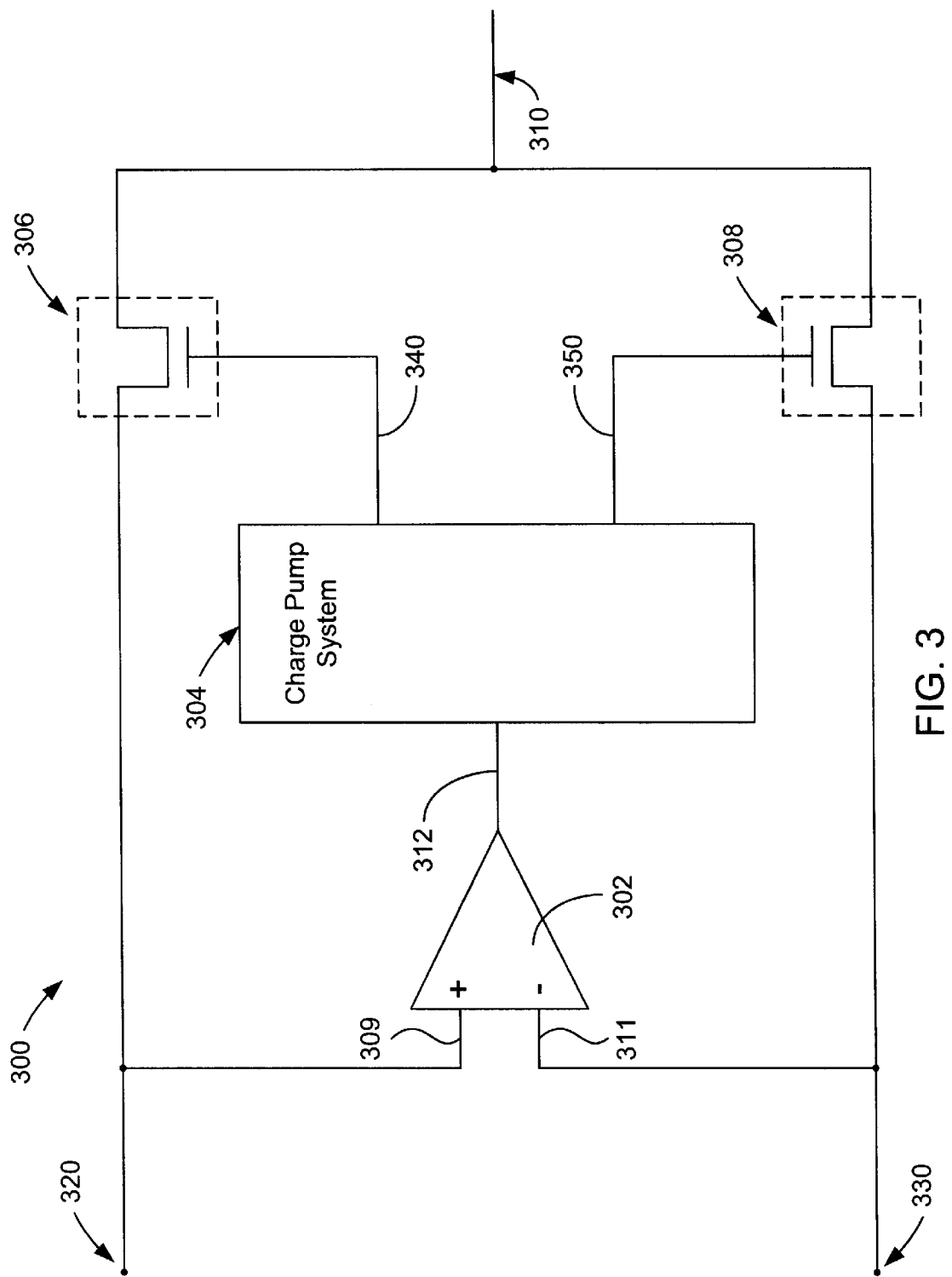
FIG. 3 is a schematic diagram of a voltage source switching circuit according to another embodiment of the invention.

FIG. 3 is a schematic diagram of a voltage source switching circuit 300 according to another embodiment of the invention. The voltage source switching circuit 300 includes a comparator 302, a charge pump system 304, a first switch 306, and a second switch 308. As shown in FIG. 3, the first and second switches 306 and 308 can be implemented as Field-effect Transistors (FETs) to facilitate switching between a first voltage source line 320 and a second voltage source line 330. The comparator 302 has a positive input terminal 309 that connects to a first voltage source line 320, and has a negative input terminal 311 that connects to a second voltage source line 330. The first voltage source line 320 and the second voltage source line 330 are respectively connected to first and second source voltages (not shown). In one implementation, the first and second source voltages can be provided by powers rails, namely an AC powered rail and a battery powered rail.

The comparator 302 compares the voltage levels on the first and second voltage source lines 320 and 330 and outputs a control signal 312. In one implementation, the control signal is "HIGH" when the voltage on the first voltage source line 320 exceeds the voltage on the second voltage source line 330, and the control signal is "LOW" when the voltage on the second voltage source line 330 exceeds the voltage on the first voltage source line 320. Besides the basic comparison operation, the comparator 302 can additionally include other features such as a preference or hysteresis to provide improved performance. A preference towards switching to the first voltage source (e.g., AC source) over the second voltage source (e.g., battery) is often desirable so that when AC power is available it is used even when its voltage level is slightly diminished. Hysteresis is useful to prevent unwanted switching between the first and second voltage sources during a "ringing" period immediately following a switching operation.

The first and second switches 306 and 308 allow one of the first and second voltage sources to be coupled to an output power line 310 as an output voltage. The charge pump system 304 receives the control signal 312 and produces first and second switch signals 340 and 350. The first and second switch signals 340 and 350 control the switching state of the first and second switches 306 and 308, respectively. The first and second switches 306 and 308 are respectively supplied to gate terminals of the first and second switches 306 and 308. In producing the first and second switch signals 340 and 350, the charge pump system 304 elevates the voltage level of the first and second switch signals 340 and 350 above the respective voltage levels of the first and second voltage lines 320 and 330. By way of example, the elevation in voltage level can (when activated) be a multiple of the voltage level of the control signal 312 (e.g., elevation by a factor of three times). The first and second switch signals 340 and 350 operate to connect one of the first and second voltage sources to the output power line 310. More particularly, the first and second switch signals 340 and 350 operate to activate (i.e., turn-on) one of the first and second switches 306 and 308 and deactivates (i.e., turn-off) the other of the first and seconds switches 306 and 308. In one implementation, the first and second switches 306 and 308 are n-type FETs and the second switch signal 350 is an inverted version (i.e., complement) of the first switch signal 340. In another embodiment, the charge pump system 304 can produce a single switch signal that is supplied to both the first and second switches 306 and 308 where one of the FET switches is an n-type device and the other of the FET switches is a p-type device.

The beneficial result of the elevation in the voltage level of the first and second switch signals 340 and 350 by the charge pump system 304 is to increase the gate voltage supplied to the first and second switches 306 and 308 when they are activated (turned-on). Increasing gate voltage will advantageously lower resistance associated with a closed switch. Resistance (R) of a FET is inversely proportional to gate voltage of a switch according to the following formula:

$$R=1/(k*W/L*V_{Gon})$$

where $V_{Gon}$ is the gate voltage above the source voltage plus the threshold voltage, k is a constant, and W/L is the ratio of a FET's channel width to its length. Accordingly, by increasing the gate voltages for the first and second switches 306 and 308 when activated (i.e., turned-on), the switch 306 or 308 being activated has less resistance and thus reduced voltage drop levels. Accordingly, the voltage drop across the first and second switches 306 and 308 can be made very low.

Figure 4:
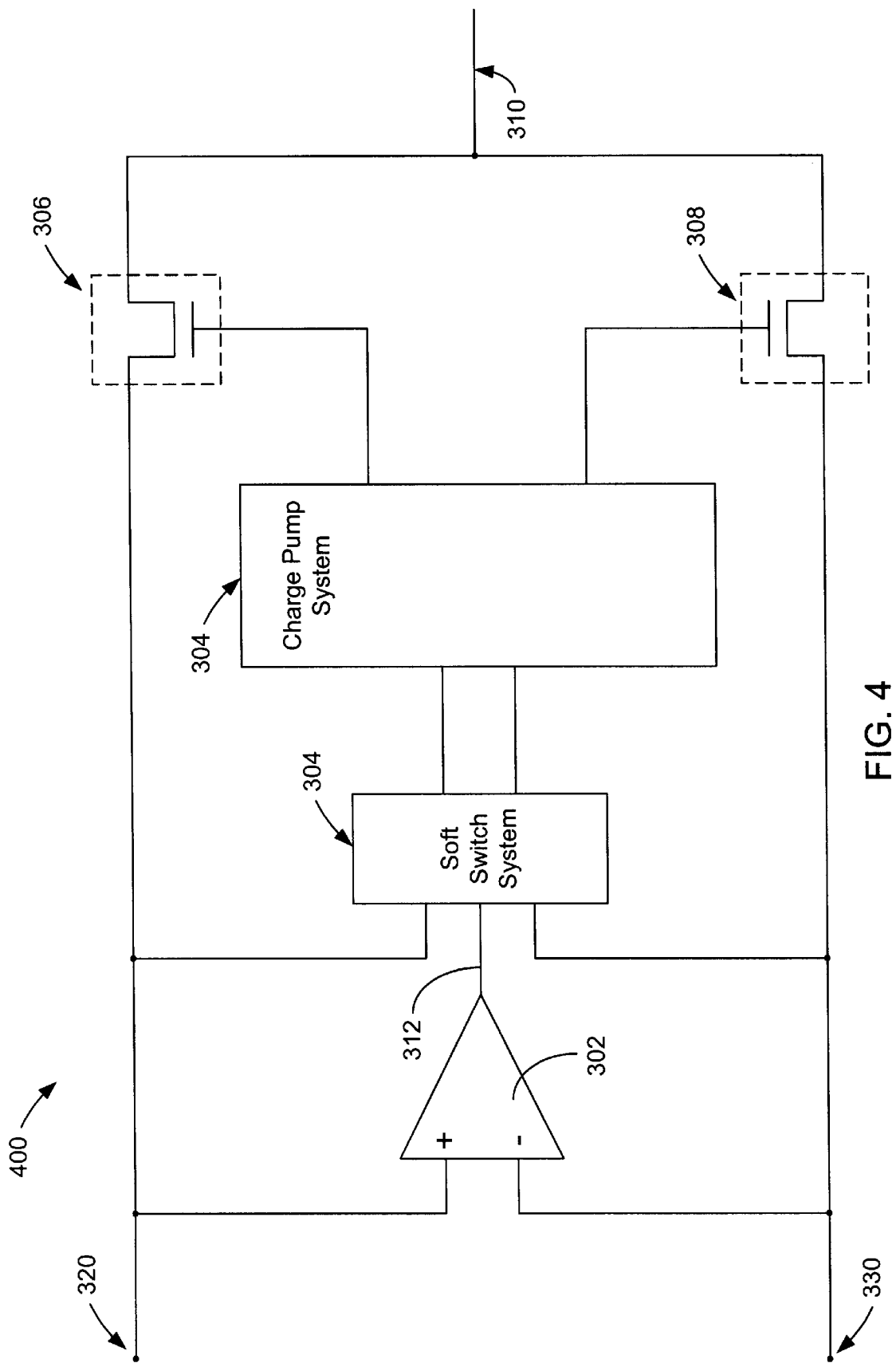
FIG. 4 is a schematic diagram of a voltage source switching circuit according to yet another embodiment of the invention.

FIG. 4 is a schematic diagram of a voltage source switching circuit 400 according to yet another embodiment of the invention. The voltage source switching circuit 400 is generally similar to the voltage source switching circuit 300 illustrated in FIG. 3. Additionally, the voltage source switching circuit 400 includes a soft switch system 332.

The soft switch circuit 332 is provided to ensure that the voltage on the output power line 310 is not disrupted due to the switching action of first and second switches 306 and 308. In other words, the voltage on the output power line 310 should switch fairly smoothly without disruptions such as "voltage spikes" or periods where no power is available. The soft switch system 332 is coupled between the comparator 302 and the charge pump system 304. The soft switch system 332 includes as inputs the control signal 312, the first voltage source line 320, and the second voltage source line 330. The soft switch system 332 outputs a first charge pump control signal 334 and a second change pump control signal 336 to the charge pump system 304. The soft switch system 332 is also coupled to the first and second voltage source lines 320 and 330. By way of example, if comparator 302 selects the first voltage source to be coupled to the output power line 310, the soft switch system 322 ensures that the first switch 306 is closed before the second switch 308 (assumed previously closed) is opened. More particularly, before the second switch 308 is opened, the first switch 306 is closed such that both the first and second switches 306 and 308 are momentarily closed. Thereafter, the second switch 308 can be opened to disconnect the second voltage source from the output power line 310. It should be noted that an internal voltage circuit can be employed to provide internal power for the operation of voltage source switching circuit 400.

Figure 5A:
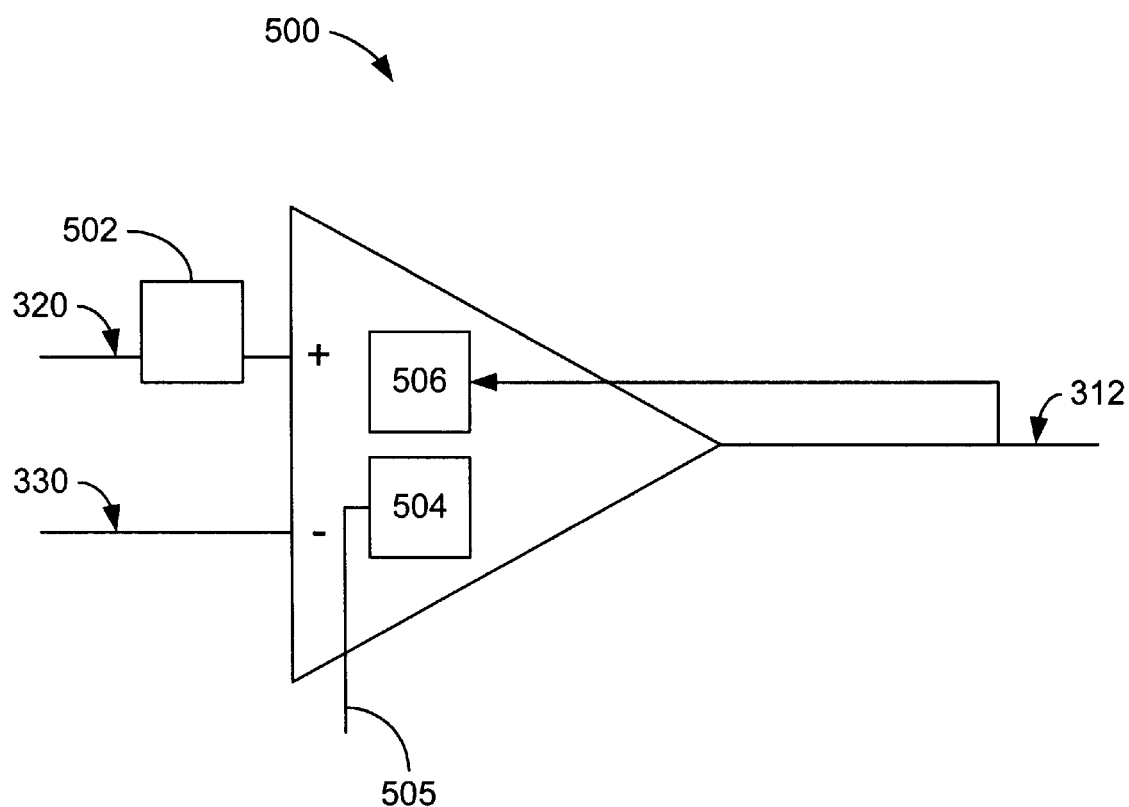
FIG. 5A is a block diagram of a comparator according to one embodiment of the invention.

FIG. 5A is a block diagram of a comparator 500 according to one embodiment of the invention. The comparator 500 is suitable for use as the comparator 302 illustrated in FIGS. 3 and 4. To provide better switching between the first and second voltage sources, the comparator 500 is more sophisticated than a basic comparator. Besides basic comparsion circuitry, the comparator 500 includes a preference circuit 502, a programmable hysteresis level circuit 504, and a blanking circuit 506. The first and second voltage sources are supplied to the comparator 500 through the first and second voltage source lines 320 and 330, and the comparator 500 eventually produces the control signal 312 that is used in controlling the first and second switches 306 and 308.

The preference circuit 502 provides a preference, or bias, towards one of the first and second voltage sources. Typically, it is desirable to prefer one supply voltage source over the other even when both supply voltages sources are present. For example, when the primary supply voltage source is derived from an AC supply and the secondary supply voltage source is a battery, it is desirable to select the primary voltage source over the secondary voltage source even when the secondary voltage source has a slightly higher output voltage. In one implementation, this preference, or bias, is achieved by applying an offset voltage to the non-inverting input of the comparator 500.

Whenever there is a change-over from one voltage source to the other, there will be an abrupt change in the currents drawn from other voltage sources. This abrupt change causes the voltage appearing on the first and second voltage source lines 320 and 330 to "ring" due to parasitic inductance in the lines and settling times of the voltage sources. Typically, this would cause the comparator to continually toggle its output between "HIGH" and "LOW" ("false" switching actions) until the voltage appearing on the first and second voltage source lines 320 and 330 are stabilized. These "false" switching actions can be eliminated by adding hysteresis to the comparator and inhibiting the comparator from making output transitions during a "blanking interval" following the first output transition. The hysteresis is provided by the programmable hysteresis circuit 504. The hysteresis level for programmable hysteresis circuit 508 can also be programmed between one of two settings through a "hysteresis select" input 505. The "blanking interval" is provided by the blanking circuit 506. The "blanking interval" is usually set to the time that it takes for the "ringing" on the first and second voltage source lines 320 and 330 to disappear.

Figure 5B:
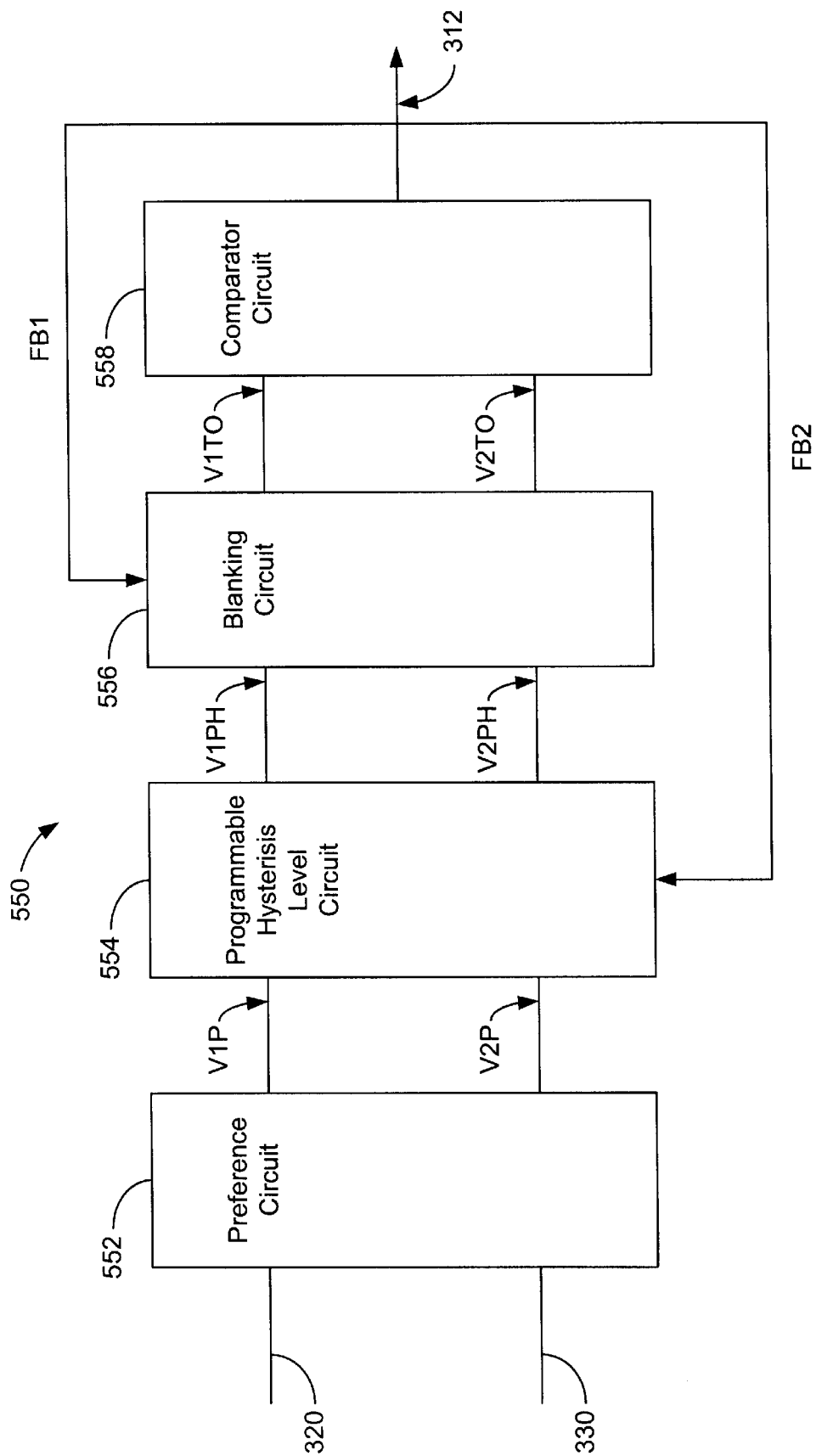
FIG. 5B is a block diagram of a comparator according to another embodiment of the invention.

FIG. 5B is a block diagram of a comparator 550 according to another embodiment of the invention. The comparator 550 is suitable for use as the comparator 302 illustrated in FIGS. 3 and 4. Although depicted differently, the comparator 550 is functionally similar to that of the comparator 500 illustrated in FIG. 5A.

The comparator 550 is more sophisticated than a basic comparator. The comparator 550 includes a preference circuit 552, a programmable hysteresis level circuit 554, a blanking circuit 556, and a comparator circuit 558. As with the comparator 312, the first and second voltage sources are supplied to the comparator 550 through the first and second voltage source lines 320 and 330, and the comparator eventually produces the control signal 312 that is used in controlling the first and second switches 306 and 308.

The preference circuit 552 couples to the first and second voltage source lines 320 and 330 and generates first and second preference voltage signals V1P and V2P. The preference circuit 552 operates to provide a preference towards switching to one of the first and second voltage sources. By way of an example, a preference function may be implemented so that the voltage for the non-preferred voltage source has to exceed the voltage of the preferred voltage source by a predetermined threshold value before the non-preferred voltage source would be selected. In other words, the preference function operates to bias the eventual switching towards use of the preferred voltage source. Typically, when the first voltage source is an AC source and the second voltage source is a battery, it is desirable to bias the switching towards the first voltage source (e.g., AC source) and away from the second voltage source (e.g., battery source) so that when AC power is available it is used even when its voltage level is slightly diminished. In one implementation, the preference function can be performed by increasing the voltage received on the first voltage source line 320 for the first voltage source relative to the voltage received on the second voltage source line 330 when generating the preference voltage signals V1P and V2P.

The programmable hysteresis level circuit 554 and blanking circuit 556 are provided to render the comparator 550 more robust and properly operable even in the presence of undesirable side-effects, such as chattering or ringing, when often can occur during a switching action. Chattering or ringing results at least in part from parasitic inductance when a current level is suddenly stopped or suddenly initiated which occurs during a switching action. These undesirable side-effects can cause the voltages on the first and second voltage source lines to reach irregular values and result in malfunction of the comparator circuit 558. To compensate for these undesirable side-effects, the programmable hysteresis level circuit 554 provides a hysteresis function for the comparator 550. The hysteresis function provides hysteresis to the switching action by requiring subsequent switching actions to exceed a hysteresis offset. The programmable hysteresis level circuit 554 receives a hysteresis feedback signal (FB1) to signal when the switching action has occurred. The programmable hysteresis level circuit 554 allow for the hysteresis offset to be progammable by a hysteresis input (Hys). For example, in one implementation, the hysteresis input (Hys) signal the programmable hysteresis level circuit 554 to used either a first hysteresis offset or a second hysteresis offset. Although these hysteresis offset amounts will vary with application, in one application, the hysteresis offset amounts can be 75 mV or 150 mV. In any case, the programmable hysteresis level circuit 554 receives the preference voltage signals V1P and V2P and produces hysteresis voltage signals V1PH and V1PH. The hysteresis voltage signals V1PH and V1PH result by modifying the preference voltage signals V1P and V2P in accordance with the programmed hysteresis offset. In one implementation, the hysteresis offset can provided modifying the voltage on the first preference voltage signal V1P relative to the voltage received on the second preference voltage signal V2P when generating the hysteresis voltage signals V1PH and V2PH. Accordingly, the hysteresis offset provided by the programmable hysteresis level circuit 554 largely ensures that the comparator circuit 558 does not erroneously switch between voltage sources due to the undesirable side-effects, such as chattering or ringing, which occur after a switching action has occurred.

The blanking circuit 556 ensures that after a switching action has occurred the comparator circuit 558 will be unable to again switch for a blanking period. Although the duration of the blanking period can vary widely with application, a representative blanking period for one implementation is 60 μsec. The blanking circuit 558 receives the hysteresis voltage signals V1PH and V2PH as well as a blanking feedback signal (FB2). Like the hysteresis feedback signal (FB1), the blanking feedback signal (FB2) signals the blanking circuit 558 when a switching action has occurred. In one implementation, the blanking period is provided by a delay circuit (e.g., resistor-capacitor delay circuit). The blanking circuit 558 modifies the hysteresis voltage signals V1PH and V2PH to generate blanking reference voltages V1TO and V2TO. More particularly, the blanking circuit 558 operates to hold the first and second switches 106 and 306 in there current state for the blanking period regardless of the hysteresis voltage signals V1PH and V2PH. After the blanking period following a switching action, the hysteresis voltage signals V1PH and V2PH pass through unmodified the blanking circuit as blanking reference voltages V1TO and V2TO.

The comparator circuit 558 receives the blanking reference voltages V1TO and V2TO from the blanking circuit 556. The comparator circuit 558 compares the blanking reference voltages V1TO and V2TO and generates the control signal 312 depending on which of the blanking reference voltage V1TO and V2TO has the higher voltage level. As an example, if the blanking reference voltage V1TO is determined by the comparator circuit 558 to be greater than the blanking reference voltage V2TO, then the control signal 312 that is output by the comparator circuit 558 causes the first voltage source to be coupled to the output power line 310 and causes the second voltage source to be decoupled from the output power line 310. Although the blanking reference voltage V1TO and V2TO have undergone significant processing to provide better operation of the comparator 550 (namely, preference, hysteresis and blanking functions), the blanking reference voltages V1TO and V2TO still essentially represent the voltages of the first and second voltage sources received by the preference circuit 552.

Figure 6:
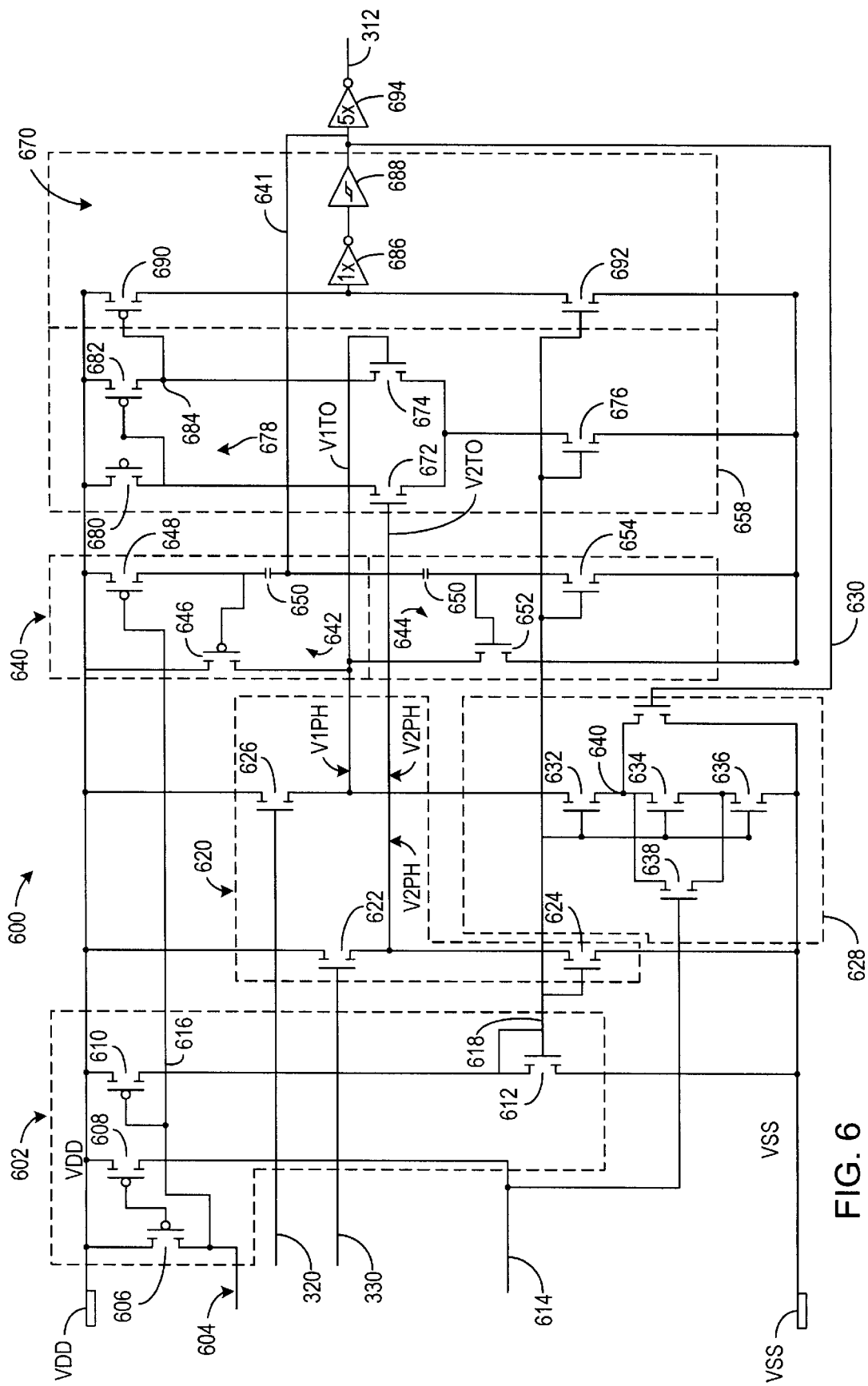
FIG. 6 is a detailed schematic of a comparator according to one embodiment of the invention.

FIG. 6 is a detailed schematic of a comparator 600 according to one embodiment of the invention. The comparator 600 represents a detailed embodiment of the comparator 500 illustrated in FIG. 5A or the comparator 550 illustrated in FIG. 5B.

The comparator 600 includes a biasing circuit 602 that receives a bias voltage signal 604. The biasing circuit 602 includes pFETs 606–612 and nFET 612. The biasing circuit 602 also receives a hysteresis signal 614 that selects a hysteresis level. As is well known to those skilled in the art, the biasing circuit 602 can be utilized to generate biasing voltages for comparator 600. The biasing voltages are provided to various portions of the comparator 600 via first and second bias lines 616 and 618.

A preference circuit 620 couples to the first and second voltage source lines 320 and 330 and corresponds to the preference circuit .502 illustrated in FIG. 5. The preference circuit 620 includes nFETs 622–626. The preference is implemented by a difference in channel width between the nFET 622 and the nFET 626. In the implementation shown in FIG. 6, the nFET 622 has a standard width (m=1) and the nFET 626 has a larger width (m=1.25). The preference circuit 620 also shares circuitry with a programmable hysteresis level circuit 628. The preference circuit 620 in combination with the programmable hysteresis level circuit 628 produce the hysteresis voltage signals V1PH and V2PH.

The programmable hysteresis level circuit 628 receives the hysteresis signal 614, the second bias line 618 (derived from bias voltage signal 604) and a hysteresis feedback signal 630. The programmable hysteresis level circuit 628 includes nFETs 632–638. The nFET 638 receives the hysteresis signal 614 and select one of two available hysteresis levels to be utilized in the comparator 600. The nFET 640 receives the hysteresis feedback signal 630 and serves to bypass nFETs 634 and 636 following the switching action. In this implementation, the programmable hysteresis level circuit 628 couples to the nFET 626 of the preference circuit 626 and thus effects only the hysteresis voltage signal V1PH. Generally speaking, the selection of the hysteresis level and the hysteresis operation are provided by altering the current from the output terminal of the preference circuit 620 carrying the hysteresis voltage signal V1PH to ground (i.e., through the programmable hysteresis level circuit 628).

The comparator 600 also includes a blanking circuit 640. The hysteresis voltage signals V1PH and V2PH and a blanking feedback signal 641 are supplied to the blanking circuit 640. The blanking circuit 640 includes a first portion 642 and a second portion 644. The first portion 642 includes pFETs 646 and 648 and a capacitor 650. The pFET 648 and the capacitor 650 provide a blanking period by forming a resistor-capacitor (RC) delay circuit. The pFET 646 clamps the hysteresis voltage signal V1PH to a supply voltage (VDD) when activated for the blanking period by the blanking feedback signal 641. The second portion 644 includes FETs 652 and 654 and a capacitor 656. The FET 654 and the capacitor 656 provide a blanking period by forming a resistor-capacitor (RC) delay circuit. The pFET 652 clamps the hysteresis voltage signal V1PH to a supply voltage (VSS) when activated for the blanking period by the blanking feedback signal 641. When not clamping the hysteresis voltage signal V1PH, the blanking circuit 640 pass through the hysteresis voltage signal V1PH and the hysteresis voltage signal V2PH. In any case, the blanking circuit 640 outputs the blanking reference voltages V1TO and V2TO.

The comparator 600 also includes a comparator circuit 658 and an output stage 670. As it is well understood by those skilled in the art, the comparator circuit 658 can be implemented by utilizing a pair of FETs 672 and 674, a current source 676, and a current mirror 678. The current mirror is formed by pFETs 680 and 682. The comparator circuit 658 compares the blanking reference voltages V1TO and V2TO and produces a comparator output signal at node 684. The comparator output signal has a first logic level when the blanking reference voltage V1TO exceeds the blanking reference voltage V2TO or has a second logic level when the blanking reference voltage V2TO exceeds the blanking reference voltage V1TO. The comparator output signal from the comparator circuit 658 is supplied to the output stage 670 which serves to amplify the comparator output signal. The output stage 670 includes an inverter 686, a buffer 688, pFET 690, nFET 692, and a final inverter 694. Although the output stage 670 can be constructed in a variety of ways, in the embodiment shown in FIG. 6, the buffer 688 is a hysteresis design to improve signals generated by comparator 658 to ensure that output levels are either at full VDD or VSS. Buffer 694 is a five-times (5×) inverter that be employed to improve the power of the output signal 312.

The invention has numerous advantages. One advantage of the invention is that voltage drops across switching elements are substantially reduced as compared to conventional approaches. Another advantage of the invention is that tolerance levels of peripheral circuitry are not compromised by the reduced voltage drops across switching elements offered by the invention. Still another advantage of the invention is that cost effective and not overly complicated implementations are possible.

What is claimed is:

1. A voltage source switch for outputting an output voltage corresponding to one of a first voltage source and a second voltage source, said voltage source switch comprising:
   a comparator for comparing voltages on the first and second voltage sources and producing first and second switch control signals, wherein said comparator includes at least:
      a hysteresis circuit that generates at least one hysteresis adjustment to resist improper switching following a switching action; and
      a blanking circuit that generates a blanking period wherein following a switching action said voltage source switch does not switch the output voltage during the blanking period;
   a first switch circuit that couples the first voltage source to the output voltage when the first switch control signal is at a first state and decouples the first voltage source from the output voltage when the first switch control signal is at a second state; and
   a second switch circuit that couples the second voltage source to the output voltage when the second switch control signal is at a first state and decouples the second voltage source from the output voltage when the second switch control signal is at a second state.

2. A voltage source switch as recited in claim 1, wherein said first switch circuit and said second switch circuit have low voltage drops across them when in the first state.

3. A voltage source switch as recited in claim 1, wherein when said first switch circuit is in the first state, the voltage drop across said first switch circuit is about 0.25 Volts at 0.5 Amps current through said first switch circuit.

4. A voltage source switch as recited in claim 1, wherein said first switch circuit and said second switch circuits have a low voltage drop relative to nominal operating voltage at least one of the first and second voltage sources.

5. A voltage source switch as recited in claim 1, wherein the first voltage source is provided by a AC power source, and wherein the second voltage source is provided by a battery-based power source.

6. A voltage source switch as recited in claim 1, wherein said first switch circuit comprises a FET, and said second switch circuit comprises a FET.

7. A voltage source switch as recited in claim 6, wherein the first and second control signals are complementary signals.

8. A voltage source switch as recited in claim 1, wherein when said first switch circuit is in the first state, the voltage drop across said first switch circuit is less than 0.4 Volts.

9. A voltage source switch as recited in claim 1, wherein when the first switch control signal is at the first state, the second switch control signal is at the second state.

10. A voltage source switch as recited in claim 1, wherein when the second switch control signal is at the first state, the first switch control signal is at the second state.

11. A voltage source switch as recited in claim 1, wherein a charge pump system generates at least one the first and second switch signals such that the signal generated by the charge pump has a voltage level that is increased in relation to the output voltage.

12. A voltage source switch as recited in claim 11, wherein when the first switch control signal is in the first state, the voltage drop across said first switch circuit is inversely proportional to the voltage on the first switch control signal.

13. A voltage source switch as recited in claim 1, wherein said voltage source switch further comprises:
   a soft switch system that ensures that before one of the first or second voltage sources is decoupled from the output voltage, the other voltage source is coupled to the output voltage.

14. A voltage source switch for outputting an output voltage corresponding to one of a first voltage source and a second voltage source, said voltage source switch comprising:
   a comparator for comparing voltages on the first and second voltage sources and producing a comparator control signal, wherein said comparator includes at least:
      a hysteresis circuit that generates at least one hysteresis adjustment to resist improper switching following a switching action; and
      a blanking circuit that generates a blanking period wherein following a switching action said voltage source switch does not switch the output voltage during the blanking period;
   a charge pump system that receives the comparator control signal and generates first and second switch signals, at least one of the first and second switch signals having a voltage level that is increased in relation to the output voltage;
   a first switch circuit that couples the first voltage source to the output voltage when the first switch control signal is at a first state and decouples the first voltage source from the output voltage when the first switch control signal is at a second state; and
   a second switch circuit that couples the second voltage source to the output voltage when the second switch control signal is at a first state and decouples the second voltage source from the output voltage when the second switch control signal is at a second state.

15. A voltage source switch as recited in claim 14, wherein when the first switch control signal is in the first state, the voltage drop across said first switch circuit is inversely proportional to the voltage on the first switch control signal.

16. The voltage source switch as recited in claim 14, wherein said voltage switch source further comprises:
   a soft switch system that ensures that before one of first or second voltage sources is decoupled from the output voltage, the other voltage source is coupled to the output voltage.

17. A voltage source switch for outputting an output voltage corresponding to one of a first voltage source and a second voltage source, said voltage source switch comprising:
   a comparator for comparing voltages on the first and second voltage sources and producing a comparator control signal, wherein said comparator includes at least:
      a preference circuit that provides a switching preference to one of the first and second voltage sources;
      a hysteresis circuit that generates at least one hysteresis adjustment to resist improper switching following a switching action; and
      a blanking circuit that generates a blanking period wherein following a switching action said voltage source switch does not switch the output voltage during the blanking period;
   a charge pump system that receives the comparator control signal and generates first and second switch signals, at least one of the first and second switch signals having a voltage level that is increased in relation to the output voltage;

a first switch circuit that couples the first voltage source to the output voltage when the first switch control signal is at a first state and decouples the first voltage source from the output voltage when the first switch control signal is at a second state; and a second switch circuit that couples the second voltage source to the output voltage when the second switch control signal is at a first state and decouples the second voltage source from the output voltage when the second switch control signal is at a second state.

18. A voltage source switch as recited in claim 17, wherein the first voltage source is provided by a AC power source, and wherein the second voltage source is provided by a battery-based power source.

19. A voltage source switch as recited in claim 17, wherein when the first witch control signal is in the first state, the voltage drop across said first switch circuit is inversely proportional to the voltage on the first switch control signal.

20. The voltage source switch as recited in claim 17, wherein said voltage switch source further comprises:

a soft switch system that ensures that before one of first or second voltage sources is decoupled from the output voltage, the other voltage source is coupled to the output voltage.

* * * * *

UNITED STATES PATENT AND TRADEMARK OFFICE
CERTIFICATE OF CORRECTION

PATENT NO. : 6,285,091 B1  
DATED : September 4, 2001  
INVENTOR(S) : Anthony David Chan and Anthony Gerard Russell It is certified that error appears in the above-identified patent and that said Letters Patent is hereby corrected as shown below:

Column 1,  
Line 67, after "diode" insert -- 116 would be biased above its turn-on voltage and thus switch-on and couple the main power source 104 to the output power line 110. The diode 114 would --.

Column 2,  
Line 38, "hell" should be -- help --.

Column 14,  
Line 4, "witch" should be -- switch --.

Signed and Sealed this

Seventh Day of May, 2002

Attest:

Attesting Officer

JAMES E. ROGAN  
Director of the United States Patent and Trademark Office